US010897175B2

(12) United States Patent
Yamasaki et al.

(10) Patent No.: US 10,897,175 B2
(45) Date of Patent: Jan. 19, 2021

(54) STATOR UNIT, MOTOR, AND BLOWER APPARATUS

(71) Applicant: Nidec Corporation, Kyoto (JP)

(72) Inventors: Yuta Yamasaki, Kyoto (JP); Hideki Aoi, Kyoto (JP); Yoshihisa Kitamura, Kyoto (JP); Junya Kawata, Kyoto (JP); Rui Izutsu, Kyoto (JP)

(73) Assignee: NIDEC CORPORATION, Kyoto (JP)

( * ) Notice: Subject to any disclaimer, the term of this patent is extended or adjusted under 35 U.S.C. 154(b) by 89 days.

(21) Appl. No.: 16/388,899

(22) Filed: Apr. 19, 2019

(65) Prior Publication Data

US 2019/0334406 A1  Oct. 31, 2019

(30) Foreign Application Priority Data

Apr. 27, 2018 (JP) .................. 2018-087573

(51) Int. Cl.
*H02K 5/10* (2006.01)
*H02K 5/08* (2006.01)
*H02K 1/04* (2006.01)

(52) U.S. Cl.
CPC ............. *H02K 5/10* (2013.01); *H02K 1/04* (2013.01); *H02K 5/08* (2013.01)

(58) Field of Classification Search
CPC .. H02K 5/00; H02K 5/02; H02K 5/08; H02K 5/10; H02K 5/15; H02K 5/1672; H02K 5/1732; H02K 5/1735; H02K 7/00; H02K 7/14; H02K 11/00; H02K 11/40
USPC ............................................ 310/43, 91, 194
See application file for complete search history.

(56) References Cited

U.S. PATENT DOCUMENTS

| 5,363,003 A * | 11/1994 | Harada | H02K 1/187 310/216.118 |
|---|---|---|---|
| 7,635,934 B2 | 12/2009 | Zhu et al. | |
| 7,667,359 B2 | 2/2010 | Lee et al. | |
| 2005/0093379 A1* | 5/2005 | Tanabe | H02K 3/522 310/43 |
| 2006/0043802 A1* | 3/2006 | Sugiyama | H02K 29/08 310/67 R |
| 2006/0220474 A1* | 10/2006 | Yoshida | H02K 11/40 310/43 |
| 2007/0188034 A1* | 8/2007 | Yoshida | F04D 29/063 310/90 |

(Continued)

FOREIGN PATENT DOCUMENTS

JP 2003-111373 A 4/2003

*Primary Examiner* — Tran N Nguyen
(74) *Attorney, Agent, or Firm* — Keating & Bennett

(57) ABSTRACT

A stator assembly includes a stator that drives a rotor that is rotatable about a central axis extending in a vertical direction, a stator support that supports the stator, and a filling portion that covers the stator. A first radial end portion of the stator is fixed to a second radial side surface of the stator support. An insulator of the stator includes an upper insulator covering an upper surface of a stator core. A first radial end portion of the upper insulator contacts the second radial side surface of the tubular stator support extending in an axial direction. An annular insulator concave portion that is recessed to the axial upper side is provided in the first radial end portion of the upper insulator. A first space, surrounded by the insulator concave portion, the stator core, and the stator support, is filled with a filling material.

16 Claims, 10 Drawing Sheets

(56) References Cited

U.S. PATENT DOCUMENTS

2012/0326538 A1* 12/2012 Yoshida ................. H02K 5/15
310/43

* cited by examiner

STATOR UNIT, MOTOR, AND BLOWER APPARATUS

CROSS REFERENCE TO RELATED APPLICATION

The present invention claims priority under 35 U.S.C. § 119 to Japanese Application No. 2018-087573 filed on Apr. 27, 2018, the entire contents of which are incorporated herein by reference.

1. Field of the Invention

The present disclosure relates to a stator unit, a motor, and a blower apparatus.

2. Background

In order to enhance water-proofness of a stator, a technique of covering the stator with a cover member having a covered tubular shape has been known. For example, in Japanese Unexamined Patent Application Publication No. 2007-159393, a stator assembly is disposed in an accommodation space of a first cover in order to provide a water-proof effect. A space between the first cover and the stator assembly is filled with a filler.

However, even if the space between the first cover and the stator assembly is filled with the filler, water may enter the inside of the stator through an interface between a stator support supporting the stator and the filler.

SUMMARY

Example embodiments of the present disclosure improve water resistance of a stator assembly.

A stator assembly according to an example embodiment of the present disclosure includes a stator capable of driving a rotor that is rotatable about a central axis, a stator support that supports the stator, and a filling portion that covers a surface of the stator with a filling material. The stator support has a tubular shape extending in an axial direction. A first radial end portion of the stator is fixed to a second radial side surface of the stator support. The stator includes a stator core and an insulator covering at least a portion of the stator core. The insulator includes an upper insulator covering an axial upper end surface of the stator core. A first radial end portion of the upper insulator contacts the second radial side surface of the stator support. An insulator concave portion, which is recessed to an axial upper side at an axial lower end surface and is annular about the central axis, is provided in the first radial end portion of the upper insulator. A first space, surrounded by an inner surface of the insulator concave portion, the axial upper end surface of the stator core, and the second radial side surface of the stator support, is filled by the filling material.

A motor according to an example embodiment of the present disclosure includes a rotor rotatable about a central axis, and the stator assembly that includes a stator capable of driving the rotor.

A blower apparatus according to an example embodiment of the present disclosure includes the motor, and a blade portion rotatable about a central axis together with the rotor of the motor.

According to the example embodiments of stator assemblies, motors, and blower apparatuses of the present disclosure, the water resistance of the stator assembly is improved.

The above and other elements, features, steps, characteristics and advantages of the present disclosure will become more apparent from the following detailed description of the example embodiments with reference to the attached drawings.

DETAILED DESCRIPTION

Hereinafter, example embodiments of the present disclosure will be described with reference to the drawings.

In the specification, a direction parallel to a central axis CA in a blower apparatus 300 is referred to as an "axial direction". A first direction in the axial direction from a cap 70 to be described later toward a shaft holder 11 to be described later along the axial direction is referred to as an "axial upper side". A second direction in the axial direction from the shaft holder 11 toward the cap 70 along the axial direction is referred to as an "axial lower side". In each of components, an end portion on the axial upper side is referred to as the "axial upper end portion", and an axial position of the axial upper end portion is referred to as an "axial upper end". Further, an end portion in the axial lower direction is referred to as an "axial lower end portion", and an axial position of the axial lower end portion is referred to as an "axial lower end". In addition, a surface facing the axial upper side is referred to as an "axial upper end surface" among surfaces of each of the components, and a surface facing the axial lower side is referred to as an "axial lower end surface".

In addition, a direction orthogonal to the central axis CA is referred to as a "radial direction". A direction toward the central axis CA along the radial direction is referred to as a "radial inner side" as a first radial side. A direction away from the central axis CA along the radial direction is referred to as a "radial outer side" as a second radial side. In each of the components, an end portion on the radial inner side is referred to as a "radial inner end portion", and a radial position of the radial inner end portion is referred to as a "radial inner end". Further, an end portion on the radial outer side is referred to as a "radial outer end portion", and a radial position of the radial outer end portion is referred to as a "radial outer end". In addition, a side surface facing the radial inner side is referred to as a "radial inner side surface" among surfaces of each of the components, and a side surface facing the radial outer side is referred to as a "radial outer side surface".

In addition, a direction of rotation about the central axis CA is referred to as a "circumferential direction".

In addition, in the specification, an "annular shape" includes not only a shape continuously connected without any cut along the entire circumference in the circumferential direction with the central axis as the center but also an arc shape having a cut in a part of the entire circumference with the central axis as the center.

Note that designations such as the direction, the end portion, the position, the surface, and the like described above do not indicate a positional relationship, a direction, and the like in the case of being incorporated in an actual device.

1. Example Embodiments

Figure 1:
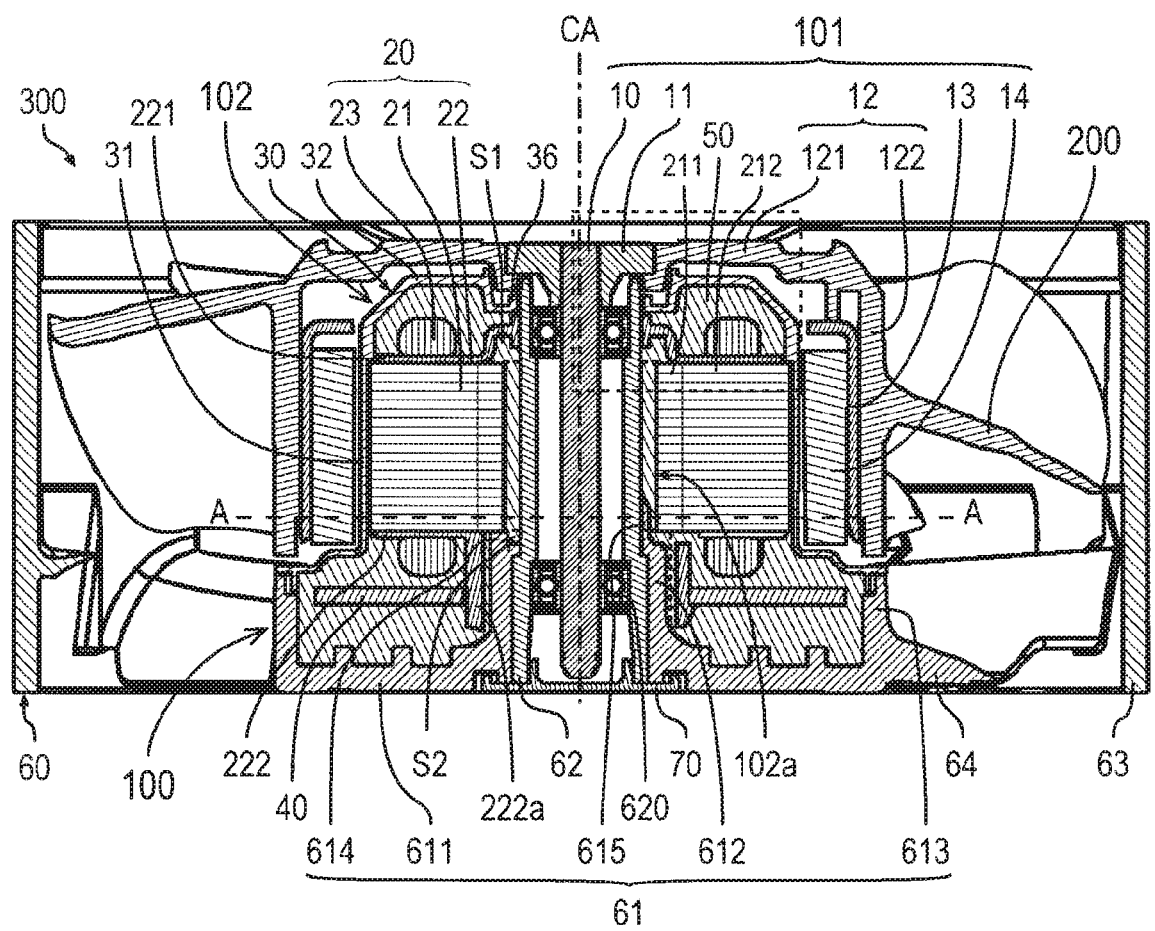
FIG. 1 is a cross-sectional view illustrating a configuration example of a blower apparatus.

FIG. 1 is a cross-sectional view illustrating a configuration example of the blower apparatus 300. FIG. 1 illustrates a cross-sectional structure of the blower apparatus 300 when the blower apparatus 300 is cut with a virtual plane including the central axis CA.

<1-1. Blower Apparatus>

The blower apparatus 300 includes a motor 100 and a blade portion 200. The motor 100 drives the blade portion 200 to rotate. The blade portion 200 is rotatable about the central axis CA extending in the vertical direction together with a rotor 101 to be described later of the motor 100. The blower apparatus 300 generates an air flow flowing the axial upper side to the axial lower side with the rotation of the blade portion 200. Note that the number of the blade portions 200 may be a singular number or plural. Preferably, the number of the blade portions 200 is a prime number. In this manner, it is possible to suppress occurrence of resonance sound.

Incidentally, the blower apparatus 300 is an axial-flow fan that sends air flow in the axial direction in the present example embodiment, but is not limited to this example. For example, the blower apparatus 300 may be a centrifugal fan that sends air flow in the radial direction.

<1-2. Motor>

Figure 2:
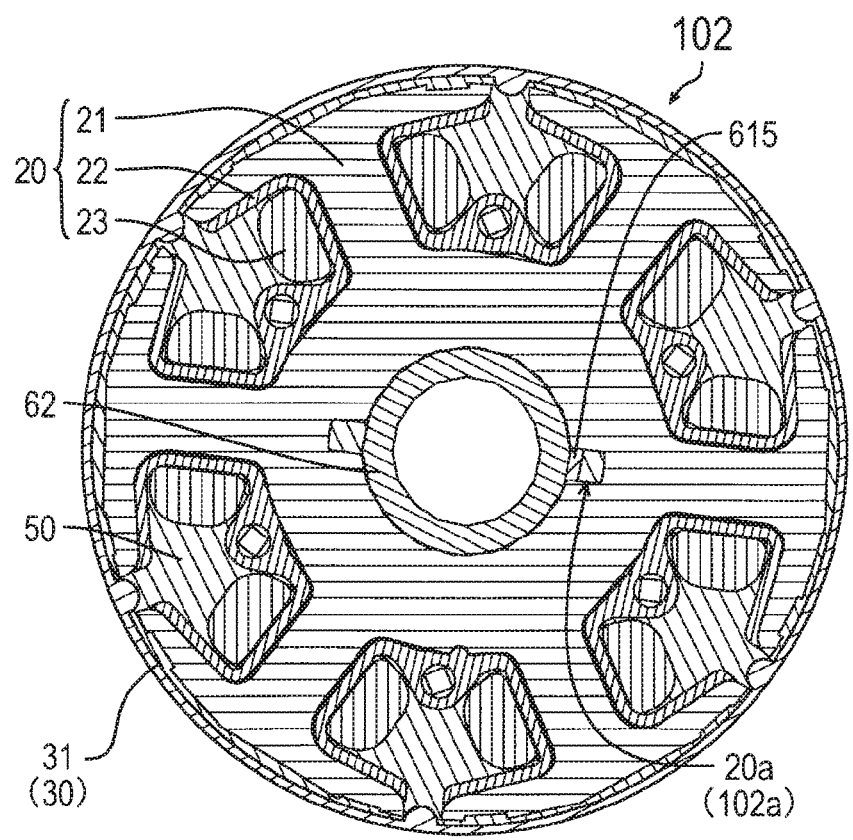
FIG. 2 is a cross-sectional view of a stator assembly of a motor as viewed from an axial direction.
Figure 3:
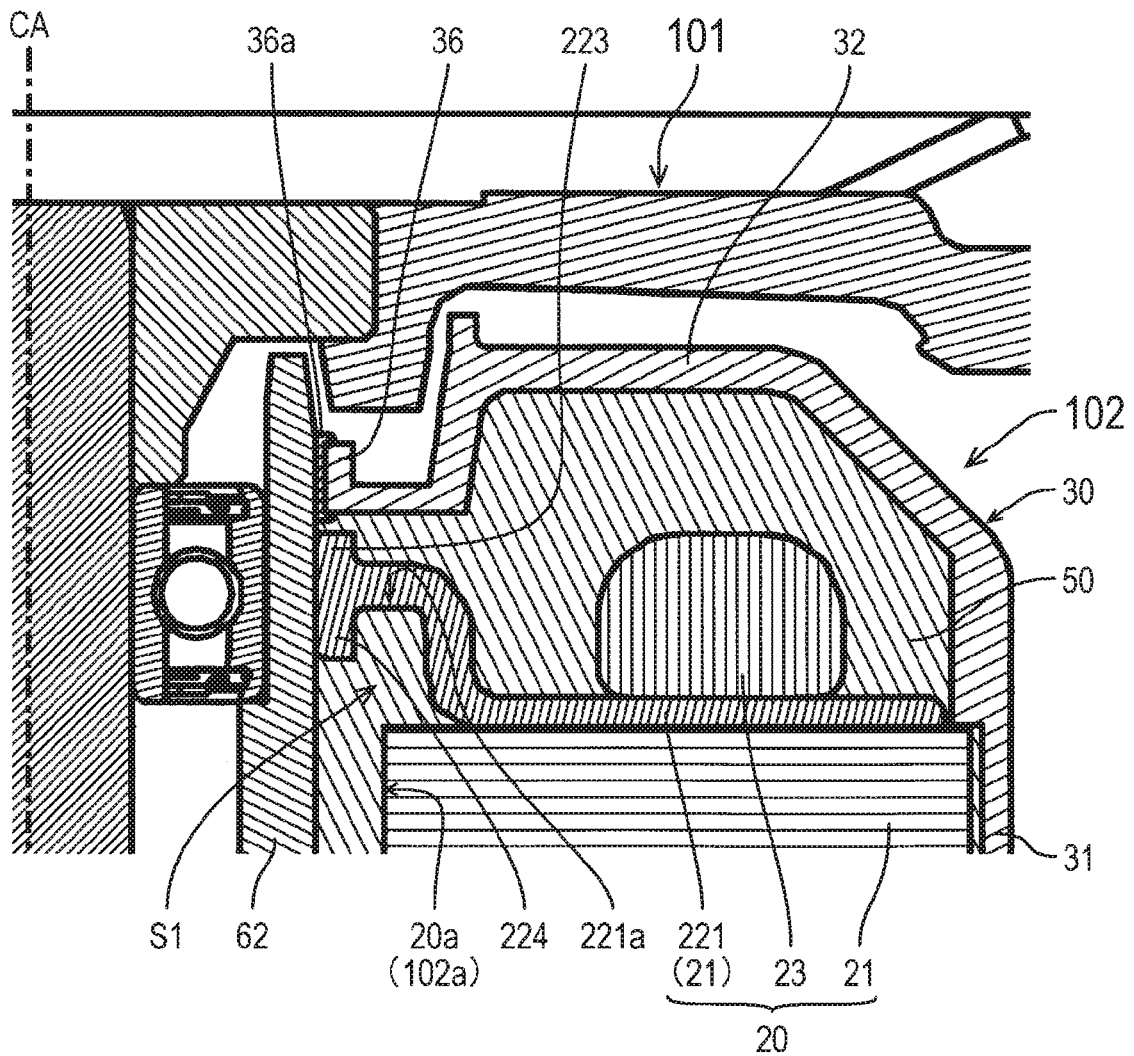
FIG. 3 is a partial cross-sectional view of the blower apparatus.

Next, a configuration of the motor 100 will be described with reference to FIGS. 1 and 2 to 3. FIG. 2 is a cross-sectional view of a stator assembly 102 to be described later of the motor 100 as viewed from the axial direction. FIG. 3 is a partial cross-sectional view of the blower apparatus 300. Note that FIG. 7 corresponds to a cross-sectional structure of the stator assembly 102 in a case where the stator assembly 102 is cut with a virtual plane perpendicular to the central axis CA along line A-A in FIG. 1. FIG. 3 corresponds to a portion surrounded by the broken line in FIG. 1.

The motor 100 includes the rotor 101 and the stator assembly 102. The rotor 101 is rotatable about the central axis CA extending in the vertical direction. The stator assembly 102 has a stator 20 to be described later that can drive the rotor 101.

<1-2-1. Rotor>

The rotor 101 has a shaft 10, a shaft holder 11, a holding member 12, a yoke 13, and a magnet 14.

The shaft 10 is a rotation axis of the rotor 101. The shaft 10 is rotatable about the central axis CA together with the shaft holder 11, the holding member 12, the yoke 13, the magnet 14, and the blade portion 200. The shaft 10 is not limited to this example, and may be a fixed shaft attached to the stator assembly 102. When the shaft 10 is the fixed shaft, a bearing is provided between the shaft 10 and the shaft holder 11.

The shaft holder 11 is attached to the shaft 10 in an axial upper portion of the motor 100. In the present example embodiment, the shaft holder 11 is attached to an axial upper end portion of the shaft 10, and extends to the radial outer side from a radial outer side surface of the shaft 10.

The holding member 12 has a covered tubular shape and includes a rotor lid portion 121 and a rotor tubular portion 122.

The rotor lid portion 121 has a plate shape that is annular about the central axis CA and extends in the radial direction. The rotor lid portion 121 covers a axial upper end portion of the rotor tubular portion 122. A radial outer end portion of the shaft holder 11 is connected to a radial inner end portion of the rotor lid portion 121. The rotor tubular portion 122 has a cylindrical shape that extends to the axial lower side from a radial outer end portion of the rotor lid portion 121. The plurality of blade portions 200 are provided on a radial outer side surface of the rotor tubular portion 122. The yoke 13 is provided on a radial inner side surface of the rotor tubular portion 122.

The yoke 13 has a tubular shape extending in the axial direction and holds the magnet 14. The magnet 14 is provided on a radial inner side surface of the yoke 13.

The magnet 14 is positioned on the radial outer side with respect to the stator 20 of the stator assembly 102 and opposes a radial outer side surface of the stator 20 in the radial direction. The magnet 14 has magnetic poles different from each other. The respective magnetic poles are alternately arranged in the circumferential direction. The magnet 14 may have an annular shape about the central axis CA. Alternatively, the magnet 14 may be a plurality of magnet pieces arranged in the circumferential direction.

<1-2-2. Stator Assembly>

The stator assembly 102 includes the stator 20, a cover member 30, a substrate 40, a filling portion 50, and a housing 60.

The stator 20 has an annular shape about the central axis CA, and is supported by a bearing holder 62 to be described later of the housing 60. As described above, the stator assembly 102 includes the stator 20. The stator 20 is capable of driving the rotor 101 which is rotatable about the central axis CA and extends in the vertical direction. More specifically, the stator 20 drives the rotor 101 to rotate in the circumferential direction when the motor 100 is driven. The stator 20 includes a stator core 21, and insulator 22, and a plurality of coil portions 23.

As described above, the stator 20 has the stator core 21. The stator core 21 is a magnetic body annular about the central axis CA, and is a stacked body in which a plurality of platy electromagnetic steel plates are stacked in the present example embodiment. The stator core 21 is fixed to the bearing holder 62. In the present example embodiment, a radial inner end portion of the stator core 21 is fixed to a radial outer side surface of the bearing holder 62. A radial outer side surface of the stator core 21 opposes the magnet 14 in the radial direction.

The stator core 21 includes a core back portion 211 and a plurality of teeth portions 212.

In other words, the stator 20 has the core back portion 211 and the plurality of teeth portions 212. The core back portion 211 is annular about the central axis CA. Each of the plurality of teeth portions 212 extends to the radial outer side from the core back portion 211.

The insulator 22 covers at least a part of the stator core 21. In particular, the insulator 22 covers at least a part of the teeth portion 212. The insulator 22 is an insulating member made of a resin material or the like.

The insulator 22 includes an upper insulator 221 and an insulator concave portion 221a. The upper insulator 221 covers an axial upper end surface of the stator core 21. A radial inner end portion of the upper insulator 221 comes in contact with the radial outer side surface of the bearing holder 62.

The insulator concave portion 221a is provided at a radial inner end portion of the upper insulator 221. The insulator concave portion 221a is recessed to the axial upper side at an axial lower end surface of the upper insulator 221. In addition, the insulator concave portion 221a is annular about the central axis CA. More specifically, the insulator concave portion 221a is provided on an axial lower end surface in the radial inner end portion of the upper insulator 221.

In addition, the insulator 22 further includes a lower insulator 222 and a support arm portion 222a. The lower insulator 222 covers an axial lower end surface of the stator core 21. The support arm portion 222a is provided on an axial lower end surface of the lower insulator 222.

The support arm portion 222a extends to the axial lower side from the axial lower end surface of the lower insulator 222 and supports the substrate 40.

In addition, the insulator 22 further includes a first edge portion 223. The first edge portion 223 extends to the axial upper side from the radial inner end portion of the upper insulator 221. The radial inner side surface of the first edge portion 223 comes in contact with the radial outer side surface of the bearing holder 62. In this manner, the contact area between the insulator 22 and the bearing holder 62 becomes wider due to the first edge portion 223. Further, a filling material of the filling portion 50 presses the first edge portion 223 toward the bearing holder 62 by shrinkage during curing. Therefore, the adhesion of the insulator 22 to the bearing holder 62 is improved, and thus, it is easy to prevent the entry of water at a contact portion between the insulator 22 and the bearing holder 62.

In addition, the insulator 22 further includes a second edge portion 224. The second edge portion 224 extends to the axial lower side from the radial inner end portion of the upper insulator 221. A radial inner side surface of the second edge portion 224 comes in contact with the radial outer side surface of the bearing holder 62. In this manner, the contact area between the insulator 22 and the bearing holder 62 becomes wider due to the second edge portion 224. In addition, the filling material presses the second edge portion 224 toward the bearing holder 62 by shrinkage during curing. Therefore, the adhesion of the insulator 22 to the bearing holder 62 is improved, and thus, it is easy to prevent the entry of water at a contact portion between the insulator 22 and the bearing holder 62.

Each of the plurality of coil portions 23 is a winding member in which a conductive wire is wound around the stator core 21 via the insulator 22. End portions of the conductive wire are electrically connected to the substrate 40.

As described above, the stator assembly 102 includes the cover member 30. The cover member 30 accommodates the stator 20. The cover member 30 has a covered tubular shape. The cover member 30 has a tubular portion 31 having a tubular shape, a lid portion 32, and a collar portion 36. The tubular portion 31 extends in the axial direction. The lid portion 32 covers the axial upper end portion of the stator 20. The collar portion 36 is provided at a radial inner end portion of the lid portion 32 and extends in the axial direction. The tubular portion 31 covers a radial side surface of the stator 20 opposing the rotor 101 in the radial direction. Further, the tubular portion 31 covers the radial outer side surface of the stator 20.

The lid portion 32 covers the axial upper end portion of the tubular portion 31. In the present example embodiment, the tubular portion 31, the lid portion 32, and the collar portion 36 are portions as a single member. The present disclosure is not limited to the above example, and at least a part of each of the tubular portion 31, the lid portion 32, and the collar portion 36 may be separate members.

A radial inner side surface of the collar portion 36 comes in contact with the bearing holder 62. Preferably, the entire radial inner side surface of the collar portion 36 comes in contact with the radial outer side surface of the bearing holder 62. However, the present disclosure is not limited to this example, and a part of the radial inner side surface of the collar portion 36 may come in contact with the radial outer side surface of the bearing holder 62. That is, it is sufficient that at least a part of the radial inner side surface of the collar portion 36 comes in contact with the bearing holder 62.

In this manner, the contact area between the cover member 30 and the bearing holder 62 becomes wider. Therefore, the entry of water and dust through the space between the cover member 30 and the bearing holder 62 can be suppressed or prevented. In addition, it is difficult for water and dust to accumulate between the cover member 30 and the bearing holder 62. Accordingly, the environmental resistance of the stator assembly 102 is improved. In addition, the dome-shaped lid portion 32 is pushed to the radial inner side by the filling material filling the space between the stator 20 and the cover member 30 at the time of forming the filling portion 50. Thus, the collar portion 36 is pressed against the bearing holder 62 by a force directed to the radial inner side. As a result, the adhesion between the collar portion 36 and the bearing holder 62 is enhanced. It is possible to prevent a leakage of the filling material between the collar portion 36 and the bearing holder 62 so that the filling material can be saved.

In the present example embodiment, the collar portion 36 comes in contact with the bearing holder 62 via an adhesive 36a. That is, the stator assembly 102 further includes the adhesive 36a. The adhesive 36a is provided between the radial inner side surface of the collar portion 36 and the radial outer side surface of the bearing holder 62. The collar portion 36 is bonded to the bearing holder 62 using the adhesive 36a. In this manner, the entry of water and dust through the space between the cover member 30 and the bearing holder 62 can be suppressed or prevented more effectively by the adhesive 36a.

The substrate 40 is arranged on the axial lower side with respect to the stator 20. The substrate 40 is electrically connected to the conductive wire of the coil portion 23 and a connection wire (not illustrated) led out of the housing 60.

As described above, the stator assembly 102 includes the filling portion 50. At least a space between the cover member 30 and the stator 20 inside the cover member 30 is filled with the filling portion 50. The filling portion 50 covers the surface of the stator 20 with a filling material. For example, the filling portion 50 covers at least a part of the stator core 21, the upper insulator 221, the lower insulator 222, the coil portion 23, and the like. The filling material of the filling portion 50 is, for example, a resin material.

Note that the filling portion 50 covers the radial outer side surface of the stator core 21 in the present example embodiment as illustrated in FIG. 2. However, the present disclosure is not limited to this example, and the tubular portion 31 of the cover member 30 may cover the radial outer side surface of the stator core 21. In this case, the filling portion 50 covers the surface of the stator core 21 other than the radial outer side surface.

Further, the filling material of the filling portion 50 fills a first space S1 in the axial upper portion of the stator assembly 102. The first space S1 is a space surrounded by an inner surface of the insulator concave portion 221*a*, the axial upper end surface of the stator core 21, and the second radial side surface of the bearing holder 62. In this manner, it is possible to suppress or prevent water from entering the stator core 21 or the like from the axial upper portion of the radial outer side surface of the bearing holder 62 by the filling portion 50 filling the first space S1. The effect of suppressing or preventing the entry of water along the radial outer side surface of the bearing holder 62 that supports the stator 20 is enhanced. Therefore, it is possible to improve the water resistance of the stator assembly 102.

The housing 60 includes a bracket portion 61, the bearing holder 62, a housing tubular portion 63, and a spoke portion 64. In other words, the stator assembly 102 includes the bracket portion 61, the bearing holder 62, the housing tubular portion 63, and the spoke portion 64. The bracket portion 61 will be described later.

The bearing holder 62 has a tubular shape that extends in the axial direction. The bearing holder 62 is inserted into the tubular bearing holder holding portion 612 to be described later of the bracket portion 61 and fixed into the bearing holder holding portion 612. In the present example embodiment, the bearing holder 62 is a stator support that supports the stator 20 in the outer rotor-type motor 100. The stator assembly 102 of the motor 100 includes the bearing holder 62 as described above. A radial inner end portion of the stator 20 is fixed to the radial outer side surface of the bearing holder 62. Bearings 620 are provided in an axial upper portion and an axial lower portion of the motor 100 inside the bearing holder 62. Further, the shaft 10 is inserted into the bearing holder 62 and the bearing 620. The bearing holder 62 rotatably supports the shaft 10 via the bearing 620. Note that the bearing 620 is a ball bearing in the present example embodiment, but is not limited to this example, and may be a sleeve bearing or the like, for example.

The housing tubular portion 63 has a tubular shape that extends in the axial direction. The housing tubular portion 63 is connected to the bracket portion 61 by the spoke portion 64 in an axial lower portion of the blower apparatus 300.

For example, a radial outer end portion of the spoke portion 64 is connected to a radial inner side surface of the housing tubular portion 63. A radial inner end portion of the spoke portion 64 is connected to a radial outer end portion of the bracket portion 61. The housing tubular portion 63 supports the bracket portion 61 via the spoke portion 64.

The housing tubular portion 63 accommodates the motor 100 and the blade portion 200. More specifically, the housing 60 accommodates the rotor 101, the stator assembly 102 other than the housing tubular portion 63, and the blade portion 200. Note that the stator assembly 102 other than the housing tubular portion 63 includes, for example, the stator 20, the cover member 30, the substrate 40, the filling portion 50, the bracket portion 61, the bearing holder 62, and the spoke portion 64.

The cap 70 is fitted into an axial lower end portion of the bearing holder 62 and covers the axial lower end portion.

Further, the stator assembly 102 further includes a communicating portion 102*a*. The communicating portion 102*a* extends in the axial direction and connects the first space S1 and a second space S2 to be described later. The communicating portion 102*a* is provided in at least one of the stator 20 and the bearing holder 62. The communicating portion 102*a* is filled with the filling material of the filling portion 50. Accordingly, it is easy to fill the first space S1 with the filling material when the filling portion 50 is provided.

For example, the communicating portion 102*a* is provided in the stator 20 in the present example embodiment. More specifically, the communicating portion 102*a* includes a first concave portion 20*a*. That is, the stator 20 has the first concave portion 20*a*. The first concave portion 20*a* is provided on the radial inner side surface of the stator 20 and is recessed to the radial outer side. More specifically, the first concave portion 20*a* is, for example, a concave portion provided on the radial inner side surface of the stator core 21.

Preferably, a plurality of the communicating portions 102*a* are provided. In this manner, when the filling portion 50 is provided, it is possible to fill some of the communicating portions 102*a* with the filling material while using the some of the communicating portions 102*a* for an air discharge path. Therefore, it is possible to more reliably supply the filling material to a space on the axial upper side of the stator 20 and to discharge air in the space. The present disclosure is not limited to this example, and the single communicating portion 102*a* may be provided.

<1-2-3. Bracket Portion>

Next, the bracket portion 61 will be described. The bracket portion 61 supports the bearing holder 62. In the present example embodiment, the bracket portion 61 has a covered tubular shape. As described above, the stator assembly 102 includes the bracket portion 61. The bracket portion 61 covers an axial lower end portion of the tubular portion 31 of the cover member 30.

The bracket portion 61 includes a lower lid portion 611, the bearing holder holding portion 612, an outer wall portion 613, an abutment portion 614, and a projecting portion 615.

The lower lid portion 611 has a plate shape that is annular about the central axis CA and extends in the radial direction. The bearing holder holding portion 612 is provided at a radial inner end portion of the lower lid portion 611. The outer wall portion 613 is provided at a radial outer end portion of the lower lid portion 611.

The bearing holder holding portion 612 protrudes to the axial upper side from the radial inner end portion of the lower lid portion 611 and extends in the circumferential direction. In the present example embodiment, the bearing holder holding portion 612 has a tubular shape that extends in the axial direction with the central axis CA as a center. The bearing holder 62 is provided at a radial inner end portion of the bearing holder holding portion 612. The abutment portion 614 and the projecting portion 615 are provided in an axial upper end portion of the bearing holder holding portion 612. The abutment portion 614 and the projecting portion 615 will be described later.

The outer wall portion 613 protrudes to the axial upper side from the radial outer end portion of the lower lid portion 611 and extends in the circumferential direction. In the present example embodiment, the outer wall portion 613 is annular about the central axis CA.

<1-2-3-1. Abutment Portion>

Figure 4A:
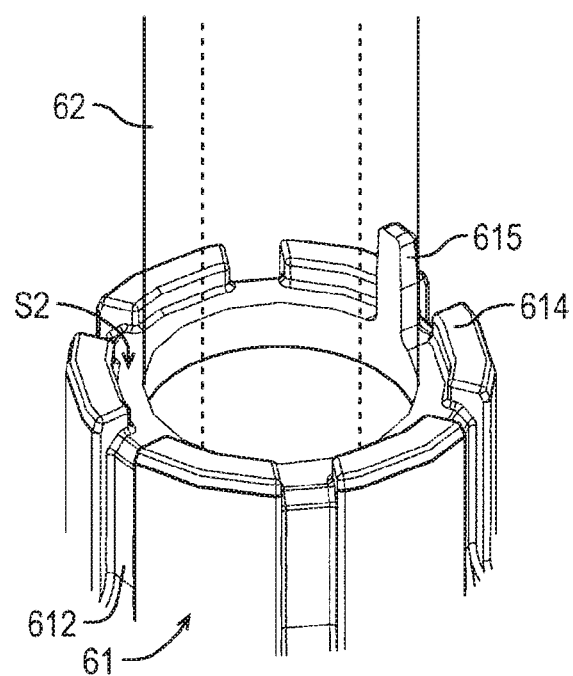
FIG. 4A is a perspective view of an axial upper end portion of a bearing holder holding portion of a bracket portion.
Figure 4B:
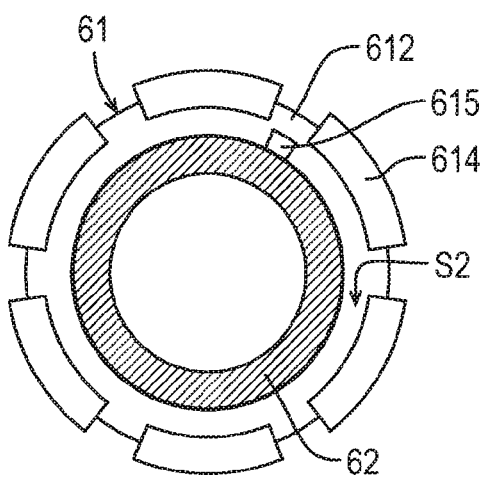
FIG. 4B is a top view of the bearing holder holding portion of the bracket portion.

Next, the abutment portion 614 will be described with reference to FIGS. 4A and 4B. FIG. 4A is a perspective view of the axial upper end portion of the bearing holder holding portion 612 of the bracket portion 61. FIG. 4B is a top view of the bearing holder holding portion 612 of the bracket portion 61.

The abutment portion 614 extends to the axial upper side from the axial upper end surface of the bearing holder holding portion 612. As described above, the bracket portion 61 has the abutment portion 614. The abutment portion 614 abuts against the radial inner end portion of the stator 20 in the axial direction. In addition, the abutment portion 614 is provided on the radial outer side with respect to the bearing holder 62 and extends in the circumferential direction. In the radial direction, the second space S2 is provided between the abutment portion 614 and the bearing holder 62. The second space S2 is a space that is annular about the central axis CA. The second space S2 is positioned on the radial inner side with respect to the abutment portion 614 and on the radial outer side with respect to the bearing holder 62. The second space S2 is filled with the filling material of the filling portion 50.

In this case, the abutment portion 614 abuts against the stator 20 so that an axial position of the stator 20 with respect to the bracket portion 61 can be determined. In addition, since the second space S2 between the abutment portion 614 and the bearing holder 62 is filled with the filling material, it is possible to suppress or prevent the entry of water into the stator core 21 or the like from the axial lower portion of the radial outer side surface of the bearing holder 62. Therefore, it is possible to further improve the water resistance of the stator assembly 102.

In the present example embodiment, a plurality of the abutment portions 614 are arrayed in the circumferential direction. In this manner, it is possible to determine the axial position of the stator 20 with respect to the bracket portion 61 without any deviation in the circumferential direction. In addition, when the filling portion 50 is provided, the filling material can be supplied to the second space S2 through the abutment portion 614. The abutment portion 614 is not limited to this example, and may be annular about the central axis CA.

<1-2-3-2. Projecting Portion>

Next, the projecting portion 615 will be described with reference to FIGS. 4A and 4B.

As described above, the bracket portion 61 further has the projecting portion 615. The projecting portion 615 extends in the axial direction and is inserted into the communicating portion 102*a*. More specifically, the projecting portion 615 extends to the axial upper side from the axial upper end surface of the bearing holder holding portion 612. It is possible to determine a circumferential position of the bracket portion 61 with respect to the stator 20 by inserting the projecting portion 615 into the communicating portion 102*a*.

The projecting portion 615 is provided on the radial inner side with respect to the abutment portion 614. In this manner, when the filling portion 50 is provided, the flow of the filling material between the abutment portions 614 is hardly hindered by the projecting portion 615. In addition, the projecting portion 615 can be provided without increasing a radial width (that is, thickness) of the bearing holder holding portion 612.

A circumferential width of the projecting portion 615 is smaller than a circumferential width of the gap between the abutment portions 614. In this manner, when the filling portion is provided, the flow of the filling material between the abutment portions 614 is even hardly hindered by the projecting portion 615. However, the circumferential width of the projecting portion 615 is not limited to this example, and may be equal to or larger than the circumferential width of the gap between the abutment portions 614.

<1-3. Modifications>

Next, modifications of the example embodiment will be described. Hereinafter, a configuration different from the above example embodiment will be described. In addition, the same components as those in the above-described example embodiment will be denoted by the same reference numerals, and descriptions thereof will be omitted in some cases.

<1-3-1. First Modification>

Figure 5A:
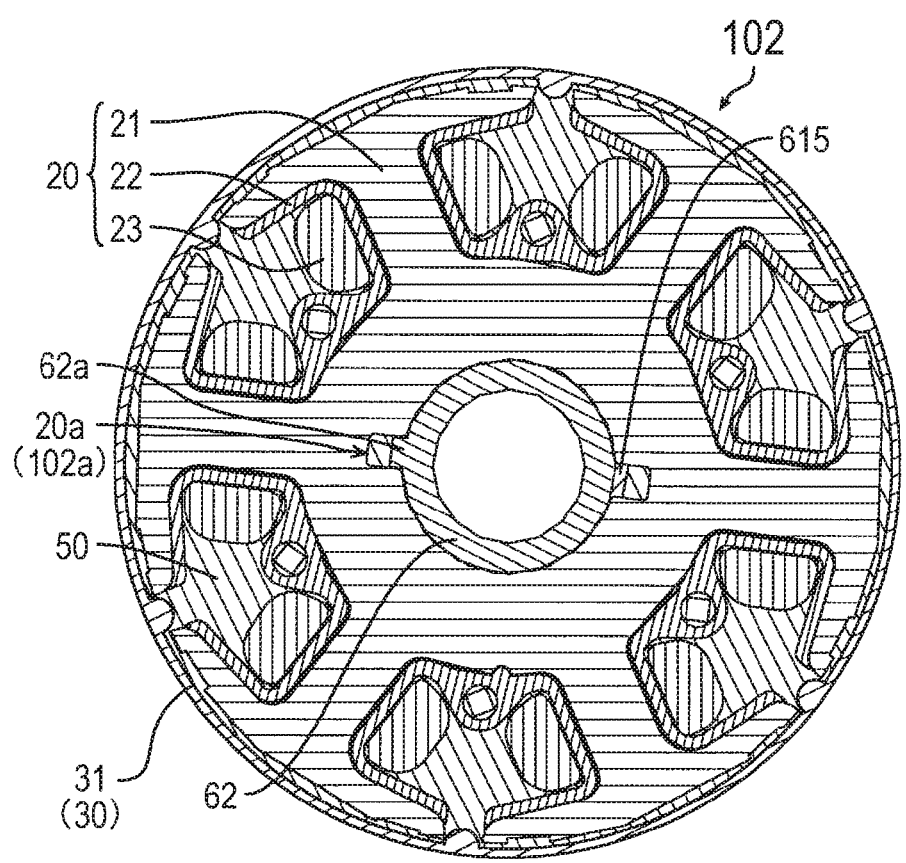
FIG. 5A is a cross-sectional view of a stator assembly according to a first modification as viewed from the axial direction.

FIG. 5A is a cross-sectional view of the stator assembly 102 according to a first modification as viewed from the axial direction.

Figure 5B:
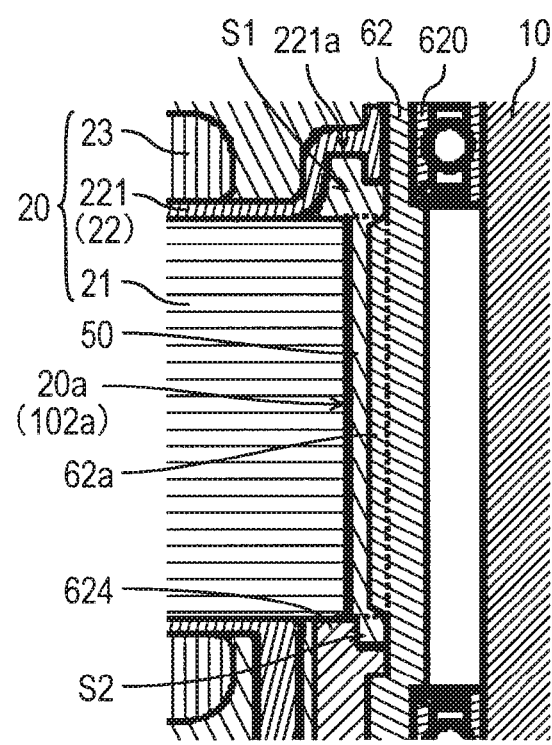
FIG. 5B is a cross-sectional view of a structure in the vicinity of a communicating portion according to the first modification as viewed from a radial direction.

FIG. 5B is a cross-sectional view of a structure in the vicinity of the communicating portion 102*a* according to the first modification as viewed from the radial direction.

Note that FIG. 5A corresponds to a cross-sectional structure of the stator assembly 102 in a case where the stator assembly 102 is cut with a virtual plane perpendicular to the central axis CA along line A-A in FIG. 1. FIG. 5B illustrates a partial cross-sectional structure of the blower apparatus 300 in a case where the blower apparatus 300 is cut with a virtual plane including the central axis CA according to the first modification.

As illustrated in FIGS. 5A and 5B, the communicating portion 102*a* includes the first concave portion 20*a*. As described above, the first concave portion 20*a* is provided on the radial inner side surface of the stator 20, and is recessed to the radial outer side. The bearing holder 62 has a first convex portion 62*a*. The first convex portion 62*a* is provided on the radial outer side surface of the bearing holder 62, protrudes to the radial outer side, and extends in the axial direction. At least a part of the first convex portion 62*a* fits into the first concave portion 20*a* provided on the radial inner side surface of the stator 20. In this manner, as the first convex portion 62*a* fits into the first concave portion 20*a*, a circumferential position of the bearing holder 62 with respect to the stator 20 can be determined.

The single first convex portion 62*a* is provided in FIG. 5A. However, the present disclosure is not limited to this example, and a plurality of the first convex portions 62*a* may be arrayed in the axial direction.

<1-3-2. Second Modification>

Figure 6A:
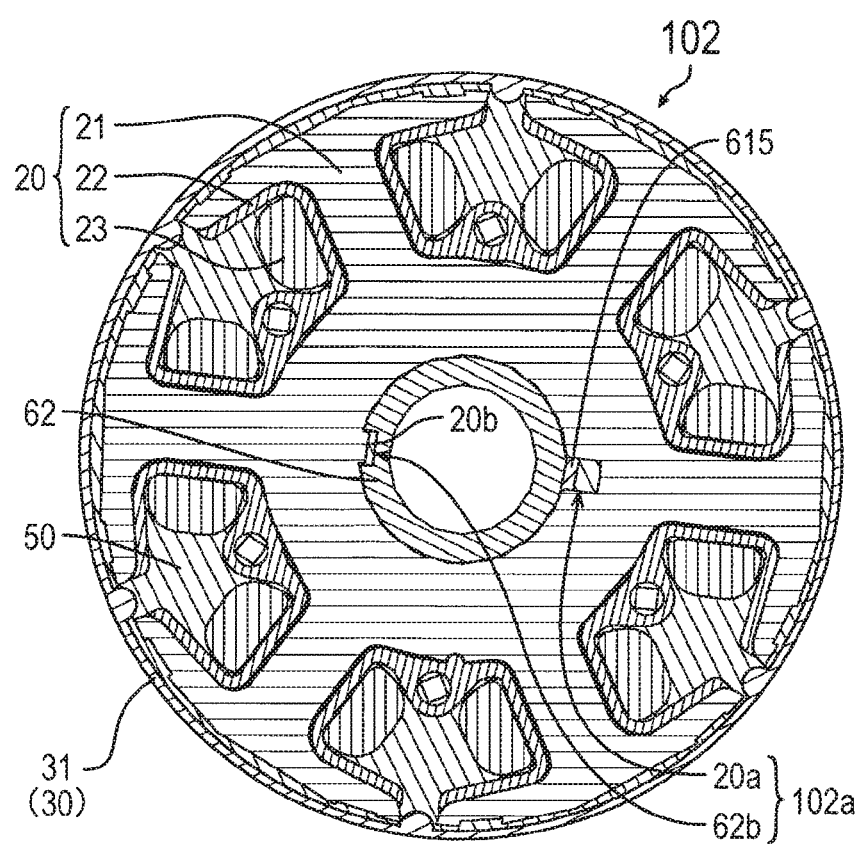
FIG. 6A is a cross-sectional view of a stator assembly according to a second modification as viewed from the axial direction.

FIG. 6A is a cross-sectional view of the stator assembly 102 according to a second modification as viewed from the axial direction.

Figure 6B:
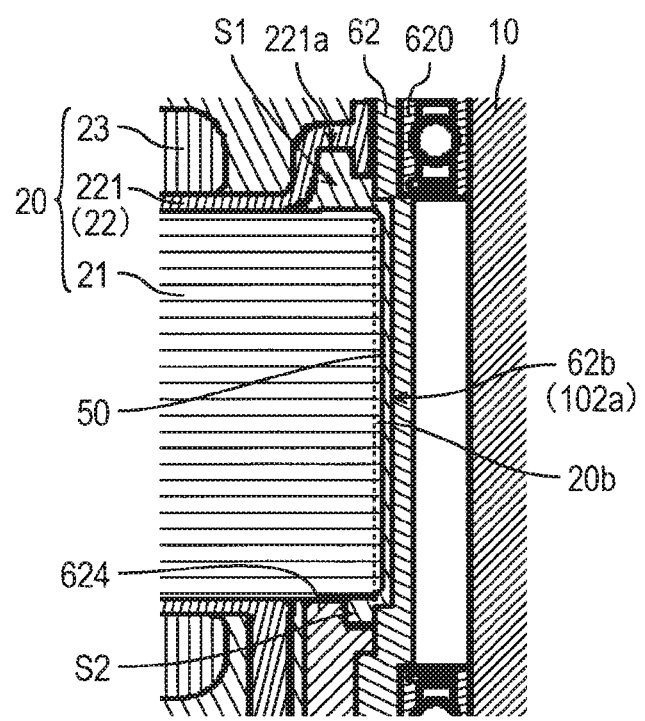
FIG. 6B is a cross-sectional view of a structure in the vicinity of a communicating portion according to the second modification as viewed from the radial direction.

FIG. 6B is a cross-sectional view of the vicinity of the communicating portion 102*a* according to the second modification as viewed from the radial direction. Note that FIG. 6A corresponds to a cross-sectional structure of the stator assembly 102 in a case where the stator assembly 102 is cut with a virtual plane perpendicular to the central axis CA along line A-A in FIG. 1. FIG. 6B illustrates a partial cross-sectional structure of the blower apparatus 300 in a case where the blower apparatus 300 is cut with a virtual plane including the central axis CA according to the second modification.

As illustrated in FIGS. 6A and 6B, the communicating portion 102*a* includes a second concave portion 62*b*. The second concave portion 62b is provided on the radial outer side surface of the bearing holder 62 and is recessed to the radial inner side. The stator 20 further includes a second convex portion 20b. The second convex portion 20b is provided on the radial inner side surface of the stator 20 and protrudes to the radial inner side. The second convex portion 20b is provided, for example, on the radial inner side surface of the stator core 21. At least a part of the second convex portion 20b fits into the second concave portion 62b. In this manner, as the second convex portion 20b fits into the second concave portion 62b, the circumferential position of the bearing holder 62 with respect to the stator 20 can be determined.

The single second convex portion 20b is provided in FIG. 6A. However, the present disclosure is not limited to this example, and a plurality of the second convex portions 20b may be arrayed in the axial direction.

<1-3-3. Third Modification>

Figure 7:
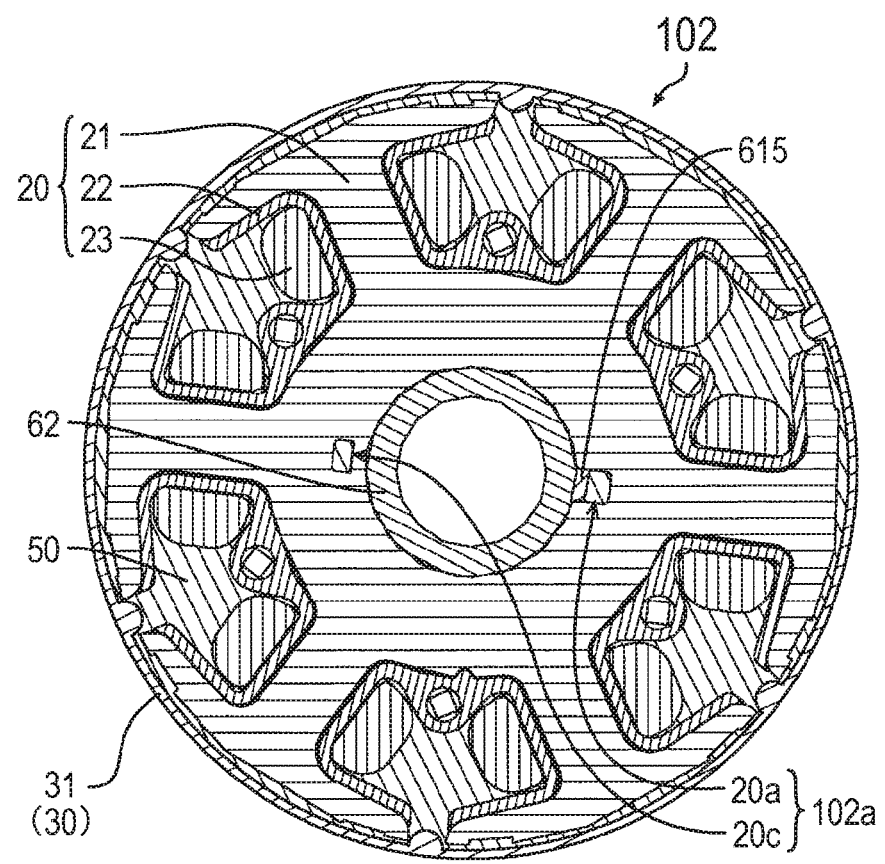
FIG. 7 is a cross-sectional view of a stator assembly according to a third modification as viewed from the axial direction.

FIG. 7 is a cross-sectional view of the stator assembly 102 according to a third modification as viewed from the axial direction. Note that FIG. 7 corresponds to a cross-sectional structure of the stator assembly 102 in a case where the stator assembly 102 is cut with a virtual plane perpendicular to the central axis CA along line A-A in FIG. 1.

As illustrated in FIG. 7, the communicating portion 102a includes a through-hole 20c. The through-hole 20c penetrates the stator 20 in the axial direction. In this manner, when the filling portion 50 is provided, it is easy to fill the space on the axial upper side with respect to the stator 20 with the filling material.

<1-3-4. Combination of Modifications>

The first to third modifications described above can be appropriately combined as long as there is no inconsistency. That is, the communicating portion 102a may include at least one of the first concave portion 20a, the second concave portion 62b, and the through-hole 20c.

2. Other

The example embodiment of the present disclosure has been described as above. A scope of the present disclosure is not limited to the above-described example embodiment. The present disclosure can be implemented with various modifications within a scope not departing from a gist of the disclosure. In addition, the matters which have been described in the above example embodiment can be combined arbitrarily within a scope having no inconsistency.

For example, the motor 100 is the outer rotor type in the above example embodiment, but is not limited to this example, and may be an inner rotor type. When the motor 100 is the inner rotor type, a "first radial side" and a "second radial side" are opposite to those in the outer rotor type. For example, in the case of the inner rotor type, the "stator support" corresponds to, for example, a casing that accommodates and supports the stator 20. Further, the radial outer end portion of the upper insulator 221 comes in contact with a radial inner side surface of the casing.

The present disclosure is useful for a motor and a blower apparatus including a stator assembly in which a stator is covered with a filling material.

While example embodiments of the present disclosure have been described above, it is to be understood that variations and modifications will be apparent to those skilled in the art without departing from the scope and spirit of the present disclosure. The scope of the present disclosure, therefore, is to be determined solely by the following claims.

What is claimed is:

1. A stator assembly comprising:
   a stator capable of driving a rotor that is rotatable about a central axis extending in a vertical direction;
   a stator support that supports the stator; and
   a filling portion that covers a surface of the stator with a filling material; wherein
   the stator support has a tubular shape extending in an axial direction;
   a first radial end portion of the stator is fixed to a second radial side surface of the stator support;
   the stator includes a stator core and an insulator covering at least a portion of the stator core;
   the insulator includes an upper insulator covering an axial upper end surface of the stator core;
   a first radial end portion of the upper insulator contacts the second radial side surface of the stator support;
   an insulator concave portion, which is recessed toward an axial upper side in an axial lower end surface and is annular about the central axis, is provided in the first radial end portion of the upper insulator; and
   a first space, surrounded by an inner surface of the insulator concave portion, the axial upper end surface of the stator core, and the second radial side surface of the stator support, is filled with the filling material.

2. The stator assembly according to claim 1, wherein
   the insulator further includes a first edge portion extending to the axial upper side from the first radial end portion of the upper insulator; and
   a first radial side surface of the first edge portion contacts the second radial side surface of the stator support.

3. The stator assembly according to claim 1, wherein
   the insulator further includes a second edge portion extending to an axial lower side from the first radial end portion of the upper insulator; and
   a first radial side surface of the second edge portion contacts the second radial side surface of the stator support.

4. The stator assembly according to claim 1, further comprising:
   a bracket portion that supports the stator support; wherein
   the bracket portion includes an abutment portion that abuts against the first radial end portion of the stator;
   the abutment portion is provided on a second radial side with respect to the stator support and extends in a circumferential direction;
   a second space, which is annular about the central axis, is provided between the abutment portion and the stator support; and
   the second space is filled with the filling material.

5. The stator assembly according to claim 4, wherein the bracket portion includes a plurality of the abutment portions arrayed in the circumferential direction.

6. The stator assembly according to claim 4, further comprising:
   a communicating portion that extends in the axial direction to connect the first space and the second space; wherein
   the communicating portion is provided in at least one of the stator and the stator support; and
   the communicating portion is filled with the filling material.

7. The stator assembly according to claim 6, wherein
   the communicating portion includes a first concave portion that is provided on a first radial side surface of the stator and is recessed to the second radial side;

the stator support includes a first convex portion that is provided on a second radial side surface of the stator support and protrudes to the second radial side; and at least a portion of the first convex portion fits into the first concave portion.

8. The stator assembly according to claim 6, wherein the communicating portion includes a second concave portion that is provided on a second radial side surface of the stator support and is recessed toward a first radial side;

the stator further includes a second convex portion that is provided on a first radial side surface of the stator and protrudes toward the first radial side; and at least a portion of the second convex portion fits into the second concave portion.

9. The stator assembly according to claim 6, wherein the communicating portion includes a through-hole that penetrates the stator in the axial direction.

10. The stator assembly according to claim 6, wherein a plurality of the communicating portions are provided.

11. The stator assembly according to claim 6, wherein the bracket portion further includes a projecting portion that extends in the axial direction and is inserted into the communicating portion.

12. The stator assembly according to claim 11, wherein the projecting portion is provided on a first radial side with respect to the abutment portion.

13. The stator assembly according to claim 1, further comprising:

a cover that has a tubular shape and accommodates the stator;

the cover includes:
  a tubular portion that extends in the axial direction;
  a lid portion that covers an axial upper end portion of the stator; and
  a collar portion that is provided in the first radial end portion of the lid portion and extends in the axial direction, and a first radial side surface of the collar portion contacts the stator support.

14. The stator assembly according to claim 13, wherein an adhesive is provided between the first radial side surface of the collar portion and a second radial side surface of the stator support.

15. A motor comprising:
  a rotor rotatable about a central axis extending in a vertical direction; and
  the stator assembly according to claim 1 including the stator capable of driving the rotor.

16. A blower apparatus comprising:
  the motor according to claim 15; and
  a blade portion rotatable about a central axis extending in a vertical direction together with the rotor of the motor.

* * * * *